Feb. 18, 1947.  B. M. OLIVER  2,415,842
ELECTRO-OPTICAL DEVICE
Filed Jan. 30, 1943  3 Sheets-Sheet 1
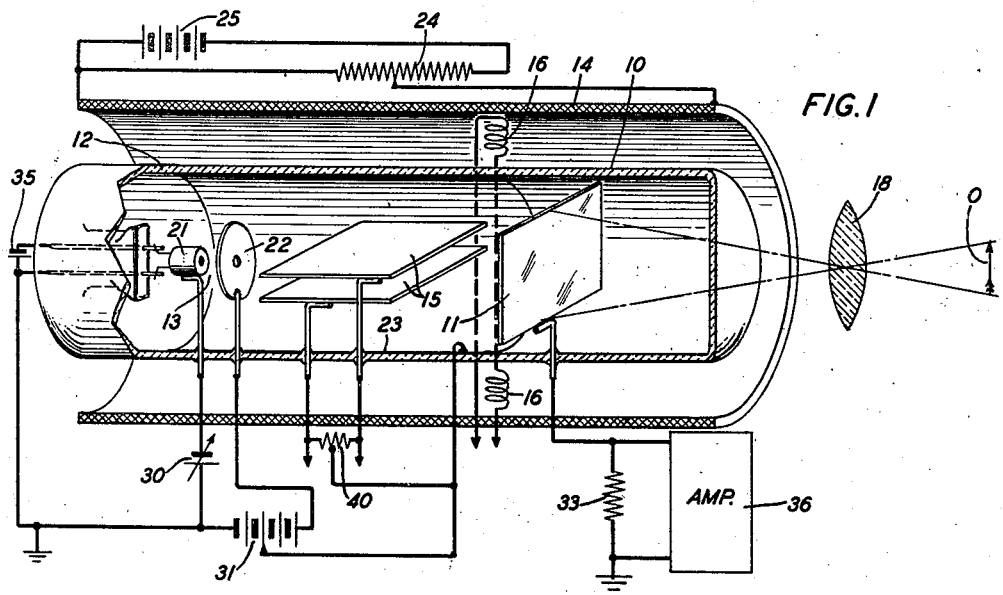
FIG. 1
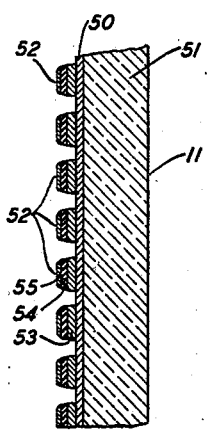
FIG. 2
FIG. 3
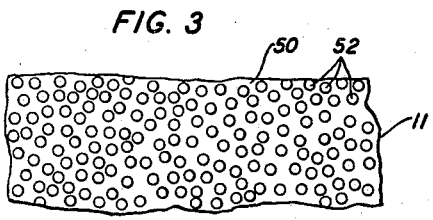
INVENTOR
B. M. OLIVER
BY
Hugh S. Weitz
ATTORNEY Feb. 18, 1947.      B. M. OLIVER           2,415,842
              ELECTRO-OPTICAL DEVICE
              Filed Jan. 30, 1943           3 Sheets-Sheet 2
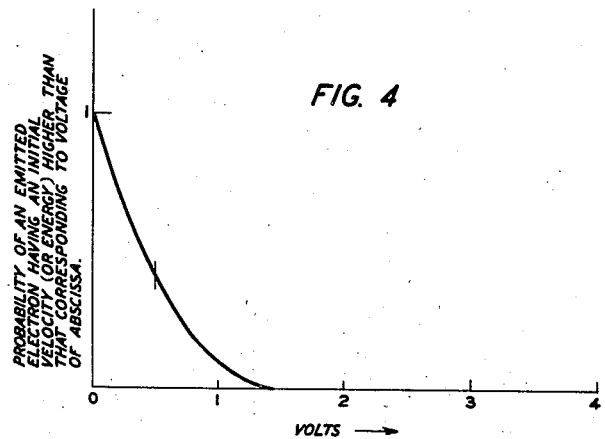
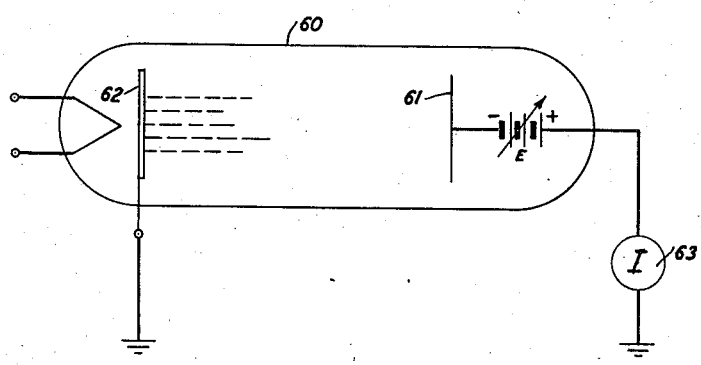
INVENTOR
B. M. OLIVER
BY
Hugh S. Wertz
ATTORNEY Feb. 18, 1947.  B. M. OLIVER  2,415,842
ELECTRO-OPTICAL DEVICE
Filed Jan. 30, 1943  3 Sheets-Sheet 3

INVENTOR
B. M. OLIVER
BY
ATTORNEY

Patented Feb. 18, 1947

2,415,842

UNITED STATES PATENT OFFICE 2,415,842

ELECTROOPTICAL DEVICE

Bernard M. Oliver, New York, N. Y., assignor to Bell Telephone Laboratories, Incorporated, New York, N. Y., a corporation of New York Application January 30, 1943, Serial No. 474,204

2 Claims. (Cl. 250—167)

This invention relates to electro-optical devices and more specifically to photo-E. M. F. devices for controlling electron beams.

A photo-E. M. F. device may be defined as a material, combination of materials, or cell which when electromagnetic radiations of certain short wave-length, like those, for example, to which the eye is sensitive, are applied thereto, will produce an electromotive force across its terminals or across two portions thereof which can serve as terminals. In the present invention, in one of its primary aspects, the voltage set up between the terminals of a photo-E. M. F. device or cell, when such waves are applied thereto, is used to control an electron beam. In describing the invention, such waves will be called light, but this term is used in a broad sense to be inclusive of radiations to which the eye is not sensitive.

It is an object of the present invention to provide an electro-optical arrangement wherein electrons of a low velocity primary beam are controlled by the voltage appearing across the terminals of a photo-E. M. F. device in response to light radiations applied thereto.

It is another object to provide an electro-optical device in which there is included photo-E. M. F. means for controlling low velocity primary electrons.

In accordance with the invention, there is provided an electro-optical device wherein the voltages set up across the terminals of elemental photo-E. M. F. cells are utilized to control electrons of a very low velocity scanning beam. The photo-E. M. F. elements are subjected to light radiations from the object to be televised.

In accordance with a preferred embodiment, chosen by way of example to illustrate the principles of novelty of the present invention, a television electron camera tube is provided which comprises an evacuated envelope enclosing means for generating a stream of very low velocity electrons, that is, electrons which have substantially zero velocity at the target, means both within and without the envelope for focusing said stream into a low velocity beam of electrons, and a target for said low velocity beam comprising a semitransparent conducting signal plate and a mosaic of semitransparent photo-E. M. F. units mounted on the signal plate. An image of an object is projected upon the photo-E. M. F. cells through the semitransparent signal plate and the other side of the target is scanned with the beam of low velocity electrons.

The principle of operation of this tube is as follows: The beam generating means produces a relatively low velocity beam, that is a beam which has almost zero velocity at the target and this beam is caused to scan the side of the target containing the photo-E. M. F. cells. These cells have applied thereto radiations from the object to be televised through the semitransparent signal plate and there is produced across each cell a voltage proportional to the light striking it from the corresponding elemental area of the object. The potential of the signal plate is adjusted to almost zero volts with respect to the cathode potential and the photovoltages act as stopping potentials which vary the number of electrons collected from the beam by the target. A video current is then formed in the signal or output resistor which is connected to the signal plate and also to a suitable video signal amplifier.

While the invention in its primary aspects relates to electron camera tubes for television or to novel photo-E. M. F. cells or targets therefor, it will be appreciated that the invention is not limited to this as the novel means described herein of controlling the flow of electrons by means of a potential produced by a photo-E. M. F. cell, which potential varies the direction of said flow, may have other uses, as in light controlled switching devices, for example.

The invention will be more readily understood by referring to the following description taken in connection with the accompanying drawings forming a part thereof, in which:

Fig. 1 is a schematic representation of a cathode ray tube of this invention and certain of its associated circuits;

Fig. 2 is a schematic view showing in greatly enlarged form a portion of the target in the arrangement of Fig. 1;

Fig. 3 is an enlarged front view of a portion of the target; and

Figure 6:
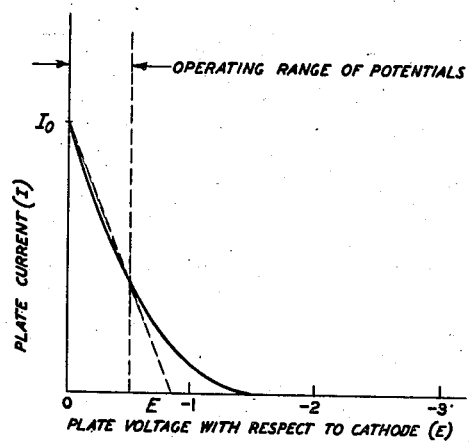
Figure 7:
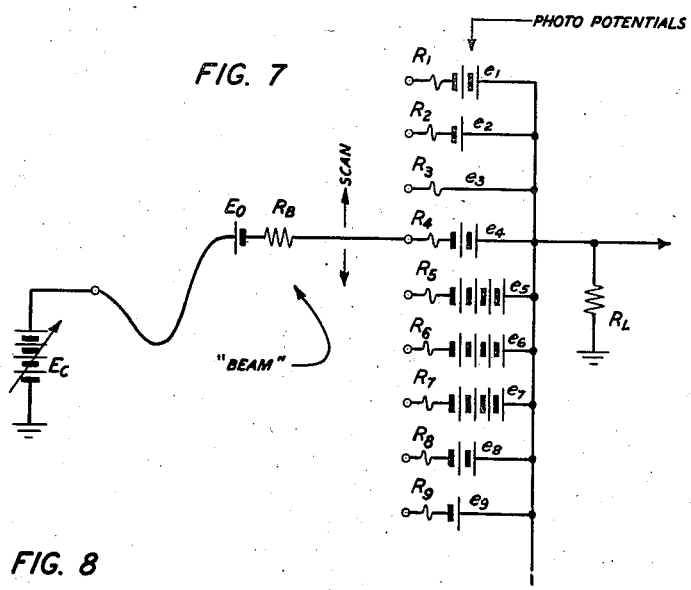

Figs. 4 to 8 inclusive, are diagrammatic and graphical representations to aid in explaining the invention.

Referring more particularly to the drawings, Fig. 1 shows, by way of example to illustrate the principles of this invention, a cathode ray transmitter tube 10 employing a two-sided mosaic 11 containing photo-E. M. F. elements. The tube 10 comprises an evacuated container 12 enclosing the mosaic target 11, an electron gun 13 for generating and, in cooperation with a magnetic focusing coil 14, for focusing a beam of low velocity electrons, and two sets of deflecting elements comprising the deflecting plates 15 and the schematically shown magnetic coils 16 for causing the beam of electrons to scan every elemental area in turn of the image of a field of view on the mosaic target 11. Radiations from an object or field of view O are applied from the side of the mosaic target 11 remote from the electron gun by means of any suitable optical system represented schematically by the lens 18.

The electron gun 13 preferably comprises a cathode (not shown), a control electrode member 21, surrounding the cathode, a first anode member 22, and a second and final anode member consisting of a conducting coating 23 on the inside walls of the envelope 12 extending from the region of the cathode to the region of the mosaic target 11. The focusing coil 14 which receives current from a potentiometer resistor 24 connected across a source of direct potential 25 assists in the focusing of the electron beam in a manner well known in the art.

The control electrode 21 is placed at any suitable negative potential with respect to the cathode by means of an adjustable source 30 and the first anode 22 is placed at an appropriate positive potential with respect to the cathode by means of the source 31. The conducting coating 23 is preferably placed at a negative potential with respect to the first anode 22. A suitable source 35 is utilized to heat the cathode. Any suitable amplifier 36 is connected to the signal resistor 33 which is connected between ground, that is, the potential of the cathode, and the conducting signal plate 50 (see Fig. 2) of the mosaic target 11. The potentials applied to the various electrode members and the configuration and spacing of these members are such that, in cooperation with the current through the focusing coil 14, a beam of low velocity focused electrons approaches the target 11 and this beam is deflected over a suitable field thereon by means of appropriate balanced sweep potentials applied to the deflecting plates 15 and appropriate currents supplied to the coils 16 by means of suitable sweep circuits (not shown). A high resistance element 40 is preferably connected between the plates 15 which, as in the well-known "Orthicon," are made as wide as the target 11. The midpoint of this resistance element is connected to the conducting coating 23. This makes the potentials of the deflecting plates balanced at all times with respect to the potential of the coating 23. The deflecting coils 16, which are shown schematically, can be of any suitable form such as, for example, the type of magnetic coils disclosed in Patent 2,278,478, issued April 7, 1942, to B. M. Oliver. For an example of a suitable electrostatic sweep circuit, reference is made to Patent 2,178,464, dated October 31, 1939, to M. W. Baldwin, Jr., which discloses suitable balanced sweep circuits for the electrostatic deflection plates 15. Any magnetic sweep circuit known to the art may be applied to the coils 16 such as, for example, one of those disclosed in Patent 2,315,073 issued March 30, 1943 to F. R. Norton.

Reference will now be made to Figs. 2 and 3 which show enlarged portions of the mosaic target 11. Fig. 2 is a greatly enlarged schematic showing of a portion of the target 11, while Fig. 3 is an enlarged showing (but not to as large a scale as Fig. 2) of a portion of the face of the target 11, viewed from the left in Figs. 1 and 2. Certain dimensions in Fig. 2 have been exaggerated at the expense of others in order to more clearly show the different screen layers which are necessarily thin. The mosaic target 11 preferably comprises a metal signal plate 50 which is made thin enough to be semitransparent.

For support, the plate 50 is preferably mounted on a glass or quartz plate 51. he plate 50 is of any suitable material, such as platinum, silver or nickel and is in the form of a coating applied to the glass 51 in any suitable way such as by cathode sputtering (or evaporation. It is electrically connected to the signal resistor 33. Each of the photo-E. M. F. elements or cells 52 carried by the plate 50 may comprise a small copper-oxide photo-E. M. F. cell which, as is well known, comprises a layer 53 of copper, a layer 54 of cuprous oxide thereon treated in a manner well known in the art to produce a blocking layer (such as by subjecting the oxide layer to an ion or electron bombardment), and a suitable conducting element 55 such as silver or gold covering the blocking layer. The elemental cells 52 can be made by forming or placing an apertured mask on the metal layer 50, forming the cells in the apertures, and then removing the mask. The mask can be made, for example, by insufflating the surface of the layer 50 which is to face the electron beam with a suitable covering material, such as wax or asphaltum powder, warming this surface gently to cause the wax or powder to adhere to it in the form of small dots, and then electroplating a layer (the mask) of nickel or other suitable material on this surface. The wax or asphaltum powder can then be dissolved in benzene leaving the apertured mask. After the photo-E. M. F. cells are formed in the apertures in the mask, the latter is stripped off, leaving the small cells distributed over the surface. In order to make the stripping operation an easy one, a thin greasy coating can be applied to the surface before the electroplating step.

The cells produced by the above method are of the type known as a "front wall" cell. In these cells a negative potential with respect to the member 50 is acquired by the metal film 55 when light radiations are applied to the cells from the object O. If desired, the cells can be produced by any suitable process which produces a "back wall" type of cell but cells of this latter type are generally not as sensitive as those of the "front wall" type. If the cells 52 are of the "back wall" type, the metal film 55 becomes positive with respect to the member 50 when light radiations are applied to the cells. The arrangement in accordance with this invention is operable with either type of cell and, moreover, is not limited to the use of the copper oxide type of photo-E. M. F. cell.

The operation of the arrangement shown in Fig. 1 is as follows, reference also being made to Figs. 2 and 3. Radiations from an object or field of view O are projected upon the right-hand side of the mosaic target 11 by means of the lens system 18. The low velocity beam of electrons, generated by the electron gun 13 and focused by this gun with the assistance of the magnetic focusing member 14, approaches the target 11. This beam has practically no velocity at the mosaic target 11 due to the fact that the signal plate 50 is placed at cathode potential through the resistor 33. The number of electrons which pass to the signal plate 50 is dependent upon the potentials generated across the individual photo-E. M. F. cells 52 by the radiations applied thereto through the transparent plate 51 and the semitransparent signal plate 50 from the corresponding elemental areas of the object. This potential between the metal member 55 of each cell and the signal plate 50 varies in accordance with the light-tone values of the elemental areas of the object and this potential, in turn, determines the number of electrons in the beam which are turned back toward the collecting electrode 23 and those which are attracted to the target 11. The current passing to the signal plate 50 passes through the resistor 33 and forms the signal current. This signal current is produced by those electrons which strike the cells and also some which pass between the cells. The current produced by these last-mentioned electrons includes also a direct current component. Unlike the storage type of electron camera tubes using photoemissive elements wherein each photoemissive element must be discharged once per cycle, each of the photo-E. M. F. cells 52 may have the potential thereacross varied at will (with the light-tone values of the corresponding elemental area of the object) and need not have this potential brought to zero once every scanning cycle.

The theory of operation of the arrangement shown in Fig. 1 can be better understood by referring to Figs. 4 to 8 inclusive. The arrangement of this invention makes use of the velocity distribution due to thermal energy which is present in every electron stream. The curve of Fig. 4 shows the approximate nature of the initial velocity distribution. In this curve, each ordinate represents the probability of an emitted electron having an initial velocity (or energy) higher than that corresponding to the voltage of the corresponding abscissa. It is obvious that if a diode 60 is constructed as in Fig. 5 and the plate 61 thereof is given a potential E as shown, only those electrons from the cathode 62 having an initial velocity greater than that corresponding to the voltage E will be collected, and the plate current (as measured by the meter 63)—plate voltage curve shown in Fig. 6 will be of a shape very similar to that shown in Fig. 4. The slope of this plate current vs. plate voltage curve as drawn represents the equivalent dynamic conductance of the beam. The reciprocal of the slope is the equivalent dynamic beam resistance. If it is assumed that this slope is constant over the operating range of potentials, then the beam resistance $R_B$ (see Fig. 7) is given by the following equation $$R_B = \frac{E_0}{I_0}$$

and it is thus seen that in so far as the plate is concerned the beam can be replaced by a resistance of this magnitude in series with an electromotive force of magnitude $E_0$.

Scanning with the beam in the present device is, therefore, equivalent to contacting in sequence the various photo-E. M. F. cells with the end of the battery-resistor combination shown in Fig. 7. The current which flows as a result of this scanning is $$i_{(\lambda)} = \frac{E_c + e_{(\lambda)} + E_0}{R_L + \frac{1}{n}R_{(\lambda)} + R_B}$$

so long as $E_c + e_{(\lambda)}$ is confined to the operating region shown in Fig. 6 over which $R_B$ obtains. In this expression $e_{(\lambda)}$ = the potential of the surface of the elementary cell as a function of the incident light (it can be positive or negative depending on whether the cell is of the "back wall" or "front wall" type) and $R_{(\lambda)}$ is the resistance of the average elementary cell, and $n$ is the effective number under the beam. In a purely photo-E. M. F. cell $R_{(\lambda)}$ is a constant.

The output voltage is equal to $$e = R_L i_{(\lambda)} = \frac{1}{1 + \frac{\frac{1}{n}R_{(\lambda)} + R_B}{R_L}}[(E_c + E_0) + e_{(\lambda)}]$$

and if $R_L \gg R_{(\lambda)} + R_B$, the output voltage is simply equal in magnitude to $e_{(\lambda)}$. It is, therefore, desirable to reduce $R_{(\lambda)}$ and $R_B$ as far as possible. $R_{(\lambda)}$ of course depends on the mosaic material, and is therefore not subject to much control. $R_B$ is made low by using a low velocity beam (as in the present invention) and a high beam current.

Figure 8:
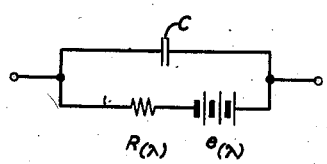

So far, the capacity across each mosaic element has been neglected. Fig. 8 shows a capacity C connected in parallel to a series arrangement of a resistance $R_{(\lambda)}$ and source of potential $e_{(\lambda)}$. In general, the effect of this capacity will be beneficial, that is, it acts to increase the output of the device. For example, if the capacity is large enough so that $(R_L + R_B)C < t_s$, where $t_s$ is the time the beam is in contact with the element during each cycle, it is no longer necessary that $R_{(\lambda)} \ll R_L$, since most of the charge required to produce the current $i_{(\lambda)}$ during the scan will come from the capacity C. $R_{(\lambda)}$ need only be low enough so that C may be recharged sufficiently by $e_{(\lambda)}$ in each interscanning interval. This requires that $$R_{(\lambda)}C < (t_c - t_s)$$

where $t_c$ is the scanning cycle duration. Ordinarily $t_c \gg t_s$.

If $R_{(\lambda)}$ does approach the value given in the above expression, the operation of the device becomes somewhat analogous to that of the well-known "Orthicon," the main difference being that in the present device the charge builds up during the cycle across each element as a result of a photo-E. M. F. in the element whereas in the "Orthicon," the build-up is due to photoemission from the element. There is, of course, the further difference that in the present device, a direct current connection exists between the output lead and the mosaic surface thereby allowing positive control of the mosaic potential with respect to the cathode.

In practice, $E_c$ would be so adjusted that $E_c + e_{(\lambda)}$, which is the potential of the surface of the mosaic (when illuminated) with respect to the cathode, lies within the limits shown in Fig. 6 for all parts of the mosaic. If the range of $e_{(\lambda)}$ is greater than the operating range of potential permissible, the scene brightness must be reduced or the lens stopped down.

In the immediately preceding mathematical discussion only the effects produced by the beam contacting the cells have been considered. As a matter of fact, the signal current is augmented by the effect of the field set up between adjacent cells by the potentials acquired by the members 55 of these cells when the beam passes between them.

The camera tube of this invention has an advantage over photoemissive electron camera tubes in that the operation of the device is not complicated by the presence of a cloud of stray electrons due to photoemission. The efficiency of the photo-E. M. F. electron camera tube is high when photo-E. M. F. cells giving a large voltage response are used.

Various modifications can be made in the em-

What is claimed is:

1. A cathode beam device for converting light variations into electrical variations comprising an enclosing envelope having therein a mosaic target for the beam comprising a conducting plate and a multiplicity of discrete photo-emf cells in conductive relationship therewith forming an array on one side thereof, a wall of said envelope being light conducting to permit light to be impressed on said cells from without the envelope to energize the cells to set up voltages thereacross dependent upon the intensity of the light incident thereon, means within said envelope for generating a beam of electrons to be directed toward the side of said target on which is located said array of cells comprising an electron-emitting electrode and an electron-accelerating electrode and means adjacent said target for decelerating said beam in the space between said accelerating electrode and said target to such an extent that the electrons have nearly zero velocity as they come close to said target, a circuit connection to said plate extending through the wall of said envelope, means adjacent said target for setting up a variable field of force within said space for deflecting said beam to cause it to scan said target, and means adjacent said envelope for setting up a constant field of force within said space to focus said beam on said target.

2. A cathode beam device for converting light variations into electrical variations comprising an enclosing envelope having therein a mosaic target for the beam comprising a light transmitting supporting plate, a light transmitting conducting layer on one side of said supporting plate, and a multiplicity of discrete photo-emf cells in conductive relationship with said conducting layer forming an array on one side thereof, a wall of said envelope on the supporting plate side of said target being light conducting to permit light to be impressed through said plate and said conducting layer to said cells to set up voltages thereacross dependent upon the intensity of the light incident thereon, means within said envelope for generating a beam of electrons to be directed toward the side of said target on which is located said array of cells comprising an electron-emitting electrode and an electron-accelerating electrode, and means adjacent said target for decelerating said beam in the space between said accelerating electrode and said target to such an extent that the electrons have nearly zero velocity as they come close to said target, a circuit connection to said plate extending through the wall of said envelope, means adjacent said target for setting up a variable field of force within said space for deflecting said beam to cause it to scan said target, and means adjacent said envelope for setting up a constant field of force within said space to focus said beam on said target.

BERNARD M. OLIVER.

REFERENCES CITED

The following references are of record in the file of this patent:

UNITED STATES PATENTS

| Number | Name | Date |
| --- | --- | --- |
| 2,120,765 | Orvin | June 14, 1938 |
| 2,168,259 | Gorlich | Aug. 1, 1939 |
| 2,140,994 | Gorlich | Dec. 20, 1938 |
| 2,131,892 | Iams | Oct. 4, 1938 |
| 2,212,923 | Miller | Aug. 27, 1940 |
| 2,217,168 | Hefele et al. | Oct. 8, 1940 |
| 2,175,691 | Iams | Oct. 10, 1939 |

FOREIGN PATENTS

| Number | Country | Date |
| --- | --- | --- |
| 190,825 | Swiss | Mar. 1, 1938 |